US006160543A

United States Patent [19]

Chen

[11] Patent Number: 6,160,543

[45] Date of Patent: Dec. 12, 2000

[54] TRANSMISSION DEVICE FOR COMPUTER VIDEO SIGNALS

[75] Inventor: Sun-Chung Chen, Taipei, Taiwan

[73] Assignee: Aten International Patent & Trademark Office, Taipei, Taiwan

[21] Appl. No.: 09/239,702

[22] Filed: Jan. 29, 1999

[51] Int. Cl.[7] .............................. G09G 5/00; H04N 7/00; H04N 7/08; H04N 11/66

[52] U.S. Cl. .......................... 345/213; 348/467; 348/475; 348/488

[58] Field of Search .................................... 345/211, 213; 348/467, 475, 488

[56] References Cited

U.S. PATENT DOCUMENTS

| | | | |
|---|---|---|---|
| 5,537,145 | 7/1996 | Miseli | 348/181 |
| 5,565,897 | 10/1996 | Kikinis et al. | 345/213 |
| 5,668,566 | 9/1997 | Yen | 345/213 |
| 6,072,532 | 6/2000 | Chich et al. | 348/478 |

*Primary Examiner*—Richard A. Hjerpe
*Assistant Examiner*—Duc Q. Dinh
*Attorney, Agent, or Firm*—Bacon & Thomas, PLLC

[57] ABSTRACT

A transmission device for computer video signals. Computer video signals can be inputted into the transmission device for processing and to be transmitted by only three pairs of transmission line (Category 5 UTP) to a remote terminal, while still maintain the function of horizontal and vertical synchronism. The transmission device has a converter for converting the polarity of horizontal synchronous signal (Hsync) and vertical synchronous signal (Vsync) into a state pulse (STATE). The state pulse (STATE), a negative pulse for vertical synchronous signal (V), a negative pulse for horizontal synchronous signal (H) are then carried respectively on the red video signal (R), the green video signal (G), and the blue video signal (B) for transmitting to a receiver in the remote terminal. The receiver in the remote terminal has a color signal recovering circuit, a polarity mode recovering circuit, and a synchronous signal recovering circuit for abstracting the negative pulse for vertical synchronous signal (V), the state pulse (STATE), and the negative pulse for horizontal synchronous signal (H) from the red video signal (R), the green video signal (G), and the blue video signal (B), and to be recovered into the original horizontal synchronous signal (Hsync) and vertical synchronous signal (Vsync), for being inputted with those recovered red video signal (R), green video signal (G), the blue video signal (B) into the monitor of the remote terminal.

4 Claims, 3 Drawing Sheets

TRANSMISSION DEVICE FOR COMPUTER VIDEO SIGNALS

FIELD OF THE INVENTION

The present invention relates to a transmission device for computer video signals, and more particularly to a transmission device for computer video signals which can transmit computer video signals synchronously by only three pairs of transmission line to a remote monitor.

BACKGROUND OF THE INVENTION

Conventional method for transmitting computer video signals utilizes a plurality of transmission lines such that each of the red video signal (R), the green video signal (G), the blue video signal (B), horizontal synchronous signal (Hsync), and vertical synchronous signal (Vsync) is transmitted by one transmission line. However, due to the progressing of the computer technology, there is a trend to decrease the number of transmission lines, so as to reduce the volume and cost of the transmission cable.

OBJECTS OF THE INVENTION

It is therefore an object of the present invention to provide a transmission device for computer video signals, such that any computer video signal can be transmitted by a low cost transmission line (Category 5 UTP). The horizontal synchronous signal (Hsync), the vertical synchronous signal (Vsync) as well as the polarity signal (of the horizontal synchronous signal and the vertical synchronous signal) are carried on a red video signal (R), a green video signal (G), and a blue video signal (B) respectively. At the remote site, the red video signal (R), the green video signal (G), the blue video signal (B), the horizontal synchronous signal (Hsync) and the vertical synchronous signal (Vsync) are then recovered.

It is another object of the present invention to provide a transmission device for computer video signals, such that only six lines of total eight lines of the Europe Internet are used to transmit computer video signals. Thus another two lines of the Europe Internet can be used for other purposes.

BRIEF DESCRIPTION OF THE DRAWINGS

The present invention can be better understood by detailed description of the following drawings, in which.

DETAILED DESCRIPTION OF THE INVENTION

Figure 1:
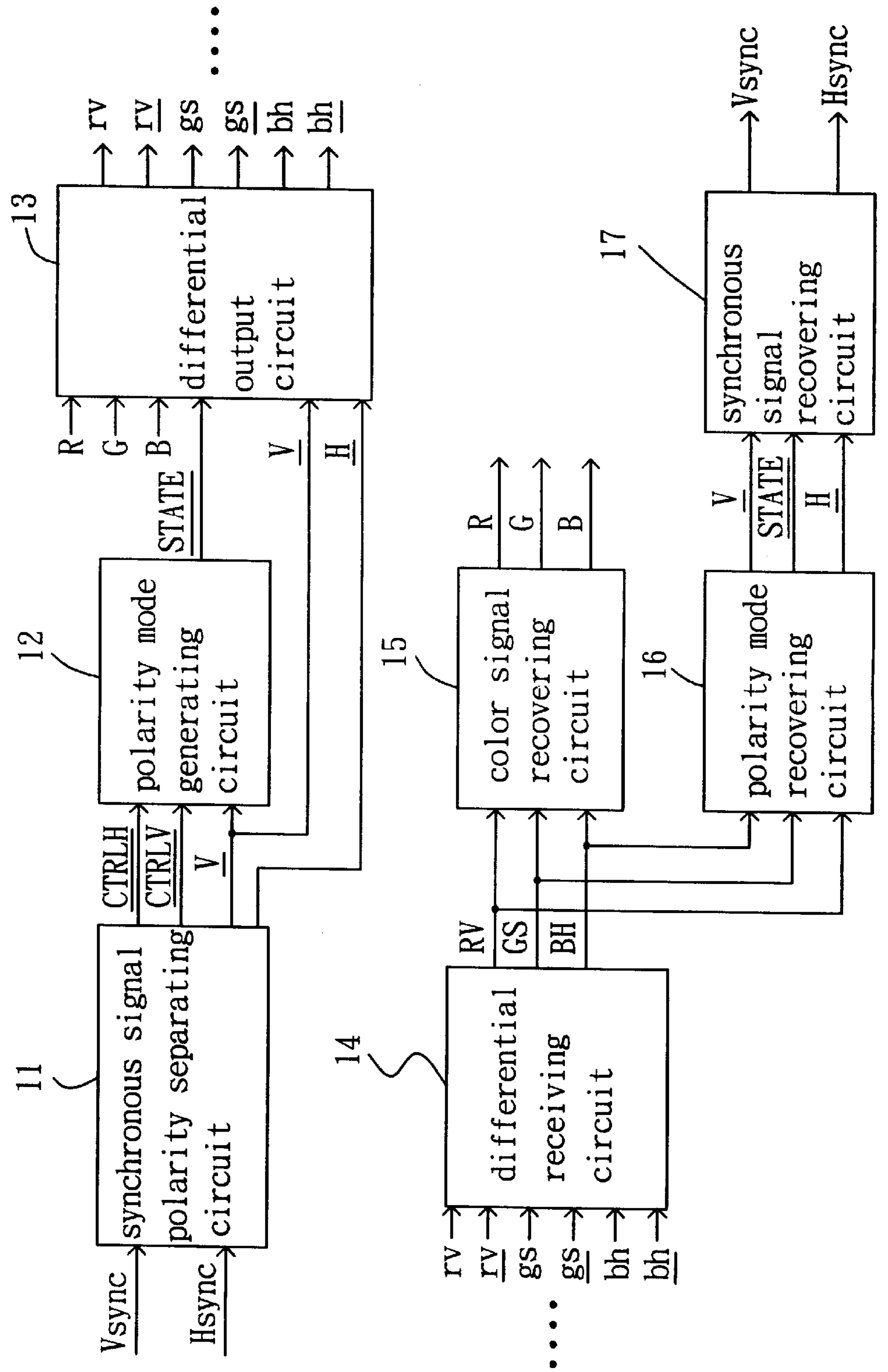
FIG. 1 is a schematic circuit block diagram showing a preferred embodiment of the present invention.

Referring to FIG. 1, which is a schematic circuit block diagram showing a preferred embodiment of the present invention. As shown in the figure, the present invention comprises a synchronous signal polarity separating circuit 11, a polarity mode generating circuit 12, a differential output circuit 13 (the above three circuits are combined to be called a converter), a differential receiving circuit 14, a color signal recovering circuit 15, a polarity mode recovering circuit 16 and a synchronous signal recovering circuit 17 (the latter four circuits are combined to be called a receiver).

The synchronous signal polarity separating circuit 11 having inputs to be linked with a horizontal synchronous signal (Hsync) and a vertical synchronous signal (Vsync) outputted from a computer video signal interface, and having outputs to be linked with the polarity mode generating circuit 12 and the differential output circuit 13, such that the horizontal synchronous signal (Hsync) and the vertical synchronous signal (Vsync) are processed to get an inverted polarity level of the horizontal synchronous signal (CTRLH), an inverted polarity level of the vertical synchronous signal (CTRLV), a negative pulse for vertical synchronous signal (V), a negative pulse for horizontal synchronous signal (H).

The polarity mode generating circuit 12 having inputs to be linked with CTRLH, CTRLV, and V signal from the synchronous signal polarity separating circuit 11, and having a state pulse (STATE) as an output to be inputted into the differential output circuit 13.

The differential output circuit 13 having inputs to be linked with the V and H signal, the STATE signal, as well as the red, green, and blue video signals, and outputting rv/rv, gs/gs, and bh/bh signals through transmission lines to a remote terminal.

The differential receiving circuit 14 in a remote terminal having inputs to be linked through transmission lines with the output signals from the differential output circuit 13, for converting the received rv/rv, gs/gs, and bh/bh signals into RV, GS, and BH signals to be outputted to the color signal recovering circuit 15 and the polarity mode recovering circuit 16.

The color signal recovering circuit 15 having inputs to be linked with the outputs from the differential receiving circuit 14, and outputting the red video signal (R), the green video signal (G), and the blue video signal (B).

The polarity mode recovering circuit 16 having inputs to be linked with the outputs from the differential receiving circuit 14, and having outputs to be linked with the synchronous signal recovering circuit 17, for removing the red, green, and blue video signals from RV, GS, and BH signals to obtain the original state pulse (STATE), the negative pulse for vertical synchronous signal (V), the negative pulse, for horizontal synchronous signal (H), and then outputting to the synchronous signal recovering circuit 17.

The synchronous signal recovering circuit 17 having inputs to be linked with the outputs from the polarity mode recovering circuit 16, and outputting the horizontal synchronous signal (Hsync) and the vertical synchronous signal (Vsync).

Figure 2:
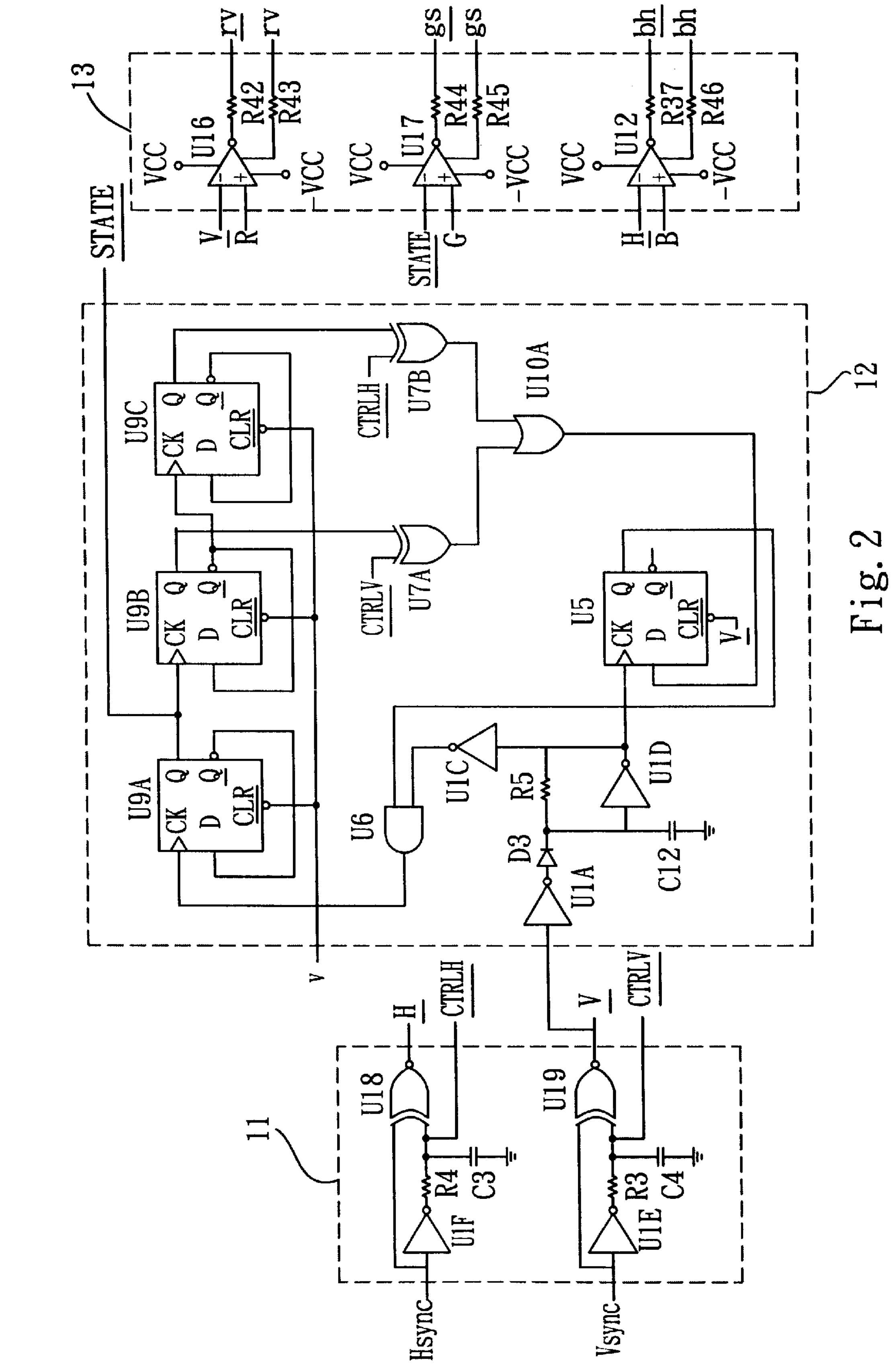
FIG. 2 is a detailed circuit diagram of a converter according to the preferred embodiment of the present invention.
Figure 3:
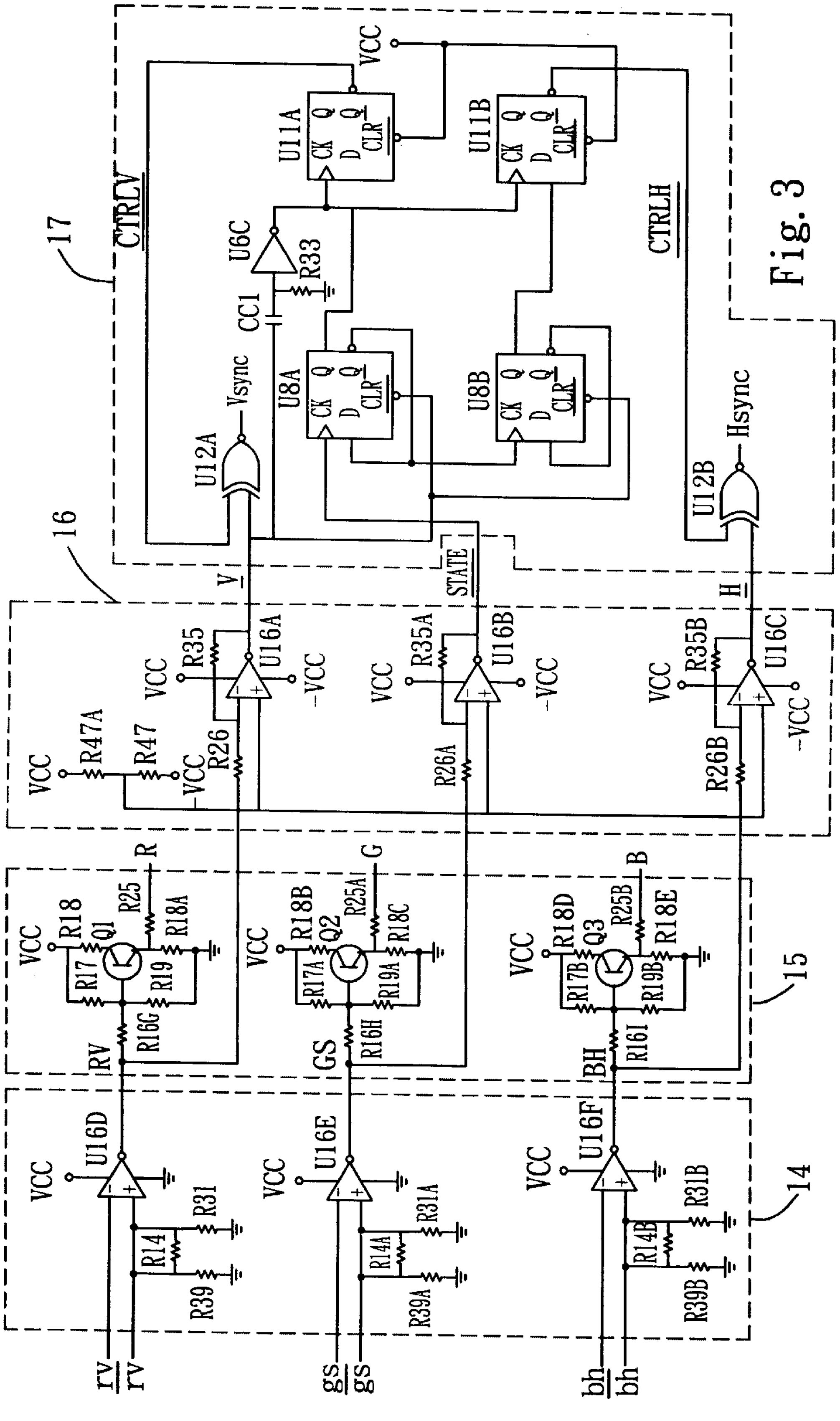
FIG. 3 is a detailed circuit diagram of a receiver according to the preferred embodiment of the present invention.

Referring to FIG. 2 and FIG. 3 next, a detailed circuit diagram according to the preferred embodiment of the present invention is described.

FIG. 2 shows a circuit diagram of the converter according to the present invention, which comprises a synchronous signal polarity separating circuit 11, a polarity mode generating circuit 12, a differential output circuit 13.

The synchronous signal polarity separating circuit 11 having inputs to be linked with an output interface of computer video signals, and having outputs to be linked with the polarity mode generating circuit 12 and the differential output circuit 13, for inverting and integrating a horizontal synchronous signal (Hsync) to get an inverted polarity level of the horizontal synchronous signal (CTRLH), and then the inverted polarity level of the horizontal synchronous signal (CTRLH) and the horizontal synchronous signal (Hsync) being inputted into an inverted exclusive-OR gate U18 to get a negative pulse for horizontal synchronous signal (H); and the vertical synchronous signal (Vsync) also being processed in a similar way to get an inverted polarity level of the vertical synchronous signal ($\overline{CTRLV}$) and a negative pulse for vertical synchronous signal ($\overline{V}$).

The negative pulse for vertical synchronous signal ($\overline{V}$) is a synchronous initiating signal for the polarity mode generating circuit 12, while $\overline{CTRLH}$ signal/$\overline{CTRLV}$ signal have four kinds of combination, i.e. low level/low level, low level/high level, high level/ low level, and high level/high level.

The polarity mode generating circuit 12 having inputs to be linked with the synchronous signal polarity separating circuit 11, and having an output to be linked with the differential output circuit 13, for receiving the negative pulse for vertical synchronous signal ($\overline{V}$) and generating a positive pulse for vertical synchronous signal (V) by a inverter U1A, such that a diode D3 is conducting, and an oscillator of R5, C12, U1D is going to oscillate and generate a clock signal (CK). The clock signal (CK) is controlled by signals $\overline{CTRLH}$ and $\overline{CTRLV}$, and by a combination of U7A, U7B, and U10A to determine if the clock signal (CK) is going to count the pulse number. When counting the pulse signals, the clock signal (CK) is inputted to each CK terminal of three cascaded D-type flip-flops U9A, U9B, and U9C, and the negative pulse for vertical synchronous signal ($\overline{V}$) is used as an initiating signal for the D-type flip-flops. The counting result will be inputted with signals $\overline{CTRLH}$ and $\overline{CTRLV}$ into U7A, U7B for logical operation, and therefore a state pulse ($\overline{STATE}$) will be obtained at the Q terminal of the first D-type flip-flop U9A for outputting.

There are four conditions for the state pulse ($\overline{STATE}$) as below:

1. If the inverted polarity level of the horizontal synchronous signal ($\overline{CTRLH}$) is a low level, and the inverted polarity level of the vertical synchronous signal ($\overline{CTRLV}$) is a low level, then the state pulse ($\overline{STATE}$) has no pulse.

2. If the inverted polarity level of the horizontal synchronous signal ($\overline{CTRLH}$) is a low level, and the inverted polarity level of the vertical synchronous signal ($\overline{CTRLV}$) is a high level, then the state pulse ($\overline{STATE}$) has one pulse.

3. If the inverted polarity level of the horizontal synchronous signal ($\overline{CTRLH}$) is a high level, and the inverted polarity level of the vertical synchronous signal ($\overline{CTRLV}$) is a low level, then the state pulse ($\overline{STATE}$) has two pulses.

4. If the inverted polarity level of the horizontal synchronous signal ($\overline{CTRLH}$) is a high level, and the inverted polarity level of the vertical synchronous signal ($\overline{CTRLV}$) is a high level, then the state pulse ($\overline{STATE}$) has three pulses.

The signals $\overline{CTRLH}$ and $\overline{CTRLV}$ can be replaced by signals CTRLH and CTRLV, i.e. the inverters U1F, U1E are omitted.

The differential output circuit 13 having inputs to be linked with the outputs from the synchronous signal polarity separating circuit 11 and the polarity mode generating circuit 12, and having outputs to be linked with transmission lines. The negative pulse for vertical synchronous signal ($\overline{V}$), the state pulse ($\overline{STATE}$), and the negative pulse for horizontal synchronous signal ($\overline{H}$) are carried on the red video signal (R), the green video signal (G), and the blue video signal (B) respectively by three differential amplifiers U16, U17, U12 in the diferential output circuit 13 to generate signals rv/$\overline{rv}$, gs/$\overline{gs}$, and bh/$\overline{bh}$ to be outputed through transmission lines to a remote terminal.

Referring to FIG. 3, which is a detailed circuit diagram of a receiver according to the preferred embodiment of the present invention. The differential receiving circuit 14 having inputs to be linked with the transmission lines, and having outputs to be linked with the color signal recovering circuit 15 and the polarity mode recovering circuit 16. Signals rv/$\overline{rv}$, gs/$\overline{gs}$, and bh/$\overline{bh}$ are converted into signals RV, GS, and BH respectively by three differential amplifiers U16D, U16E, and U16F in the differential receiving circuit 14.

The color signal recovering circuit 15 having inputs to be linked with the outputs of the differential receiving circuit 14, and outputting the red video signal (R), the green video signal (G), and the blue video signal (B). Signals RV, GS, and BH are inputted into filter circuits Q1, Q2, and Q3 respectively for filtering out the negative pulse for vertical synchronous signal ($\overline{V}$), the state pulse ($\overline{STATE}$), and the negative pulse for horizontal synchronous signal ($\overline{H}$). Therefore, the original red video signal (R), green video signal (G), and blue video signal (B) are obtained.

The polarity mode recovering circuit 16 having inputs to be linked with outputs of the differential receiving circuit 14, and having outputs to be linked with the synchronous signal recovering circuit 17. Comparators U16A, U16B, U16C are used for removing the red video signal (R), the green video signal (G), and the blue video signal (B) in signals RV, GS, and BH, so as to obtain the original negative pulse for vertical synchronous signal ($\overline{V}$), the state pulse ($\overline{STATE}$), and the negative pulse for horizontal synchronous signal ( $\overline{H}$), for being inputted into the synchronous signal recovering circuit 17.

The synchronous signal recovering circuit 17 having inputs to be linked with outputs of the polarity mode recovering circuit 16, and outputting horizontal synchronous signal (Hsync) and vertical synchronous signal (Vsync). The negative pulse for vertical synchronous signal ($\overline{V}$) from the polarity mode recovering circuit 16 is used as an initiating signal for D-type flip-flop counting circuits U8A and U8B, and is used as a latch signal for D-type flip-flop latching circuits U11A and U11B by way of a differential circuit (CC1, R33, and U6C). The state pulse ($\overline{STATE}$) is used as the clock signal for the D-type flip-flop counting circuit U8A. Therefore, the inverted polarity level of the vertical synchronous signal ($\overline{CTRLV}$) and the inverted polarity level of the horizontal synchronous signal ($\overline{CTRLH}$) are obtained from $\overline{Q}$ terminals of U11A and U12B respectively. Then the inverted polarity level of the vertical synchronous signal ( $\overline{CTRLV}$) and the inverted polarity level of the horizontal synchronous signal ($\overline{CTRLH}$) are inputted respectively with the negative pulse for vertical synchronous signal ($\overline{V}$) and the negative pulse for horizontal synchronous signal ($\overline{H}$) into exclusive OR gates U12A and U12B to get the original vertical synchronous signal (Vsync) and horizontal synchronous signal (Hsync).

To sum up, the inputted video signals and the synchronous signals can be processed by the transmission device for computer video signals according to the present invention, such that the synchronous signals are carried on the video signals and only three pairs of transmission line are needed for transmission. At the remote terminal, the receiver of the transmission device will recover the original video signals and synchronous signals.

Moreover, the order that the negative pulse for vertical synchronous signal ($\overline{V}$), the state pulse ($\overline{STATE}$), and the negative pulse for horizontal synchronous signal ($\overline{H}$) to be carried respectively on red, green, blue video signals is without any limitation. In addition, the negative pulse for vertical synchronous signal ($\overline{V}$) to be inputted into the polarity mode generating circuit 12 can be replaced by the negative pulse for horizontal synchronous signal ($\overline{H}$).

It is no doubt that after reading the above descriptions any skillful person in the art can create many different variations without departing the spirit and scope of the accompanying claims. Therefore, it is intended that the appended claims will cover all those variations.

What is claimed is:

1. A transmission device for computer video signals having a converter and a receiver, said converter receiving and processing computer video signals, and transmitting said computer video signals by only three pairs of transmission line to said receiver at a remote terminal, wherein said converter comprising:

a synchronous signal polarity separating circuit having inputs to be linked with a horizontal synchronous signal (Hsync) and a vertical synchronous signal (Vsync) outputted from a computer video signal interface, and having outputs to be linked with a polarity mode generating circuit and a differential output circuit stated as below, such that said horizontal synchronous signal (Hsync) and said vertical synchronous signal (Vsync) being processed to get an inverted polarity level of the horizontal synchronous signal (CTRLH), an inverted polarity level of the vertical synchronous signal ( CTRLV), a negative pulse for vertical synchronous signal (V), a negative pulse for horizontal synchronous signal (H);

a polarity mode generating circuit for receiving said CTRLH, CTRLV, and V signals, and outputting a state pulse (STATE) to be inputed into a differential output circuit stated as below;

a differential output circuit having inputs to be linked with said V and H signals, said STATE signal, as well as a red (R), a green (G), and a blue (B) video signals of said computer video signals, and having outputs linked with said three pairs of transmission line to be transmitted to said receiver in said remote terminal;

said receiver comprising:

a differential receiving circuit having inputs to be linked with said transmission lines, and having outputs to be outputted to a color signal recovering circuit and a polarity mode recovering circuit stated as below;

a color signal recovering circuit having inputs to be linked with said differential receiving circuit, and outputting a red video signal (R), a green video signal (G), and a blue video signal (B);

a polarity mode recovering circuit having inputs to be linked with said differential receiving circuit, and having outputs to be linked with a synchronous signal recovering circuit state as below, for removing said red, green, and blue video signals to output said negative pulse for vertical synchronous signal (V), said state pulse (STATE),and said negative pulse for horizontal synchronous signal (H).

a synchronous signal recovering circuit having inputs to be linked with said outputs from said polarity mode recovering circuit, and outputting said horizontal synchronous signal (Hsync) and said vertical synchronous signal (Vsync).

2. The transmission device according to claim 1, wherein said state pulse (STATE) has the following conditions:

a. if said inverted polarity level of the horizontal synchronous signal (CTRLH) is a low level, and said inverted polarity level of the vertical synchronous signal ( CTRLV) is a low level, then said state pulse (STATE) has no pulse;

b. if said inverted polarity level of the horizontal synchronous signal (CTRLH) is a low level, and said inverted polarity level of the vertical synchronous signal (CTRLV) is a high level, then said state pulse ( STATE) has one pulse;

c. if said inverted polarity level of the horizontal synchronous signal (CTRLH) is a high level, and said inverted polarity level of the vertical synchronous signal ( CTRLV) is a low level, then said state pulse (STATE) has two pulses.

d. if said inverted polarity level of the horizontal synchronous signal (CTRLH) is a high level, and said inverted polarity level of the vertical synchronous signal (CTRLV) is a high level, then said state pulse ( STATE) has three pulses.

said signals CTRLH and CTRLV can be replaced by signals CTRLH and CTRLV.

3. The transmission device according to claim 1, wherein said negative pulse for vertical synchronous signal (V) to be inputted into said polarity mode generating circuit can be replaced by said negative pulse for horizontal synchronous signal (H).

4. The transmission device according to claim 1, wherein said differential output circuit is used to make said negative pulse for vertical synchronous signal (V), said state pulse ( STATE), and said negative pulse for horizontal synchronous signal (H) to be carried respectively on said red video signal (R), said green video signal (G), and said blue video signal (B), the order is without limitation.

* * * * *

UNITED STATES PATENT AND TRADEMARK OFFICE

CERTIFICATE OF CORRECTION

PATENT NO. : 6,160,543
APPLICATION NO. : 09/239702
DATED : December 12, 2000
INVENTOR(S) : Sun-Chung Chen It is certified that error appears in the above-identified patent and that said Letters Patent is hereby corrected as shown below:

On the Title page in field [73] Assignee: the below named assignee should be corrected as follows:

“Aten International Patent & Trademark Office” should read: --Aten International Co., Ltd.--.

Signed and Sealed this

Twenty-ninth Day of May, 2007

JON W. DUDAS
*Director of the United States Patent and Trademark Office*